(12) United States Patent
Li

(10) Patent No.: US 8,998,513 B2
(45) Date of Patent: Apr. 7, 2015

(54) UNIPOD ROTATING APPARATUS

(71) Applicants: Zhongshan Sirui Photographic Equipment Industry Co., Ltd., Zhongshan, Guangdong (CN); Jeffrey M. Karp, Glen Ridge, NJ (US)

(72) Inventor: Jie Li, Guangdong (CN)

(73) Assignees: Zhongshan Sirui Photographic Equipment Industry Co., Ltd., Zhongshan, Guangdong (CN); Jeffrey M. Karp, Glen Ridge, NJ (US)

( * ) Notice: Subject to any disclaimer, the term of this patent is extended or adjusted under 35 U.S.C. 154(b) by 47 days.

(21) Appl. No.: 13/967,248

(22) Filed: Aug. 14, 2013

(65) Prior Publication Data

US 2015/0003820 A1 Jan. 1, 2015

(30) Foreign Application Priority Data

Jun. 28, 2013 (CN) .......................... 2013 1 0266194

(51) Int. Cl.
| | |
|---|---|
| *G03B 17/00* | (2006.01) |
| *H04N 5/225* | (2006.01) |
| *F16M 11/04* | (2006.01) |
| *F16M 11/06* | (2006.01) |
| *F16M 13/00* | (2006.01) |
| *G03B 17/56* | (2006.01) |

(52) U.S. Cl.
CPC ..................................... *G03B 17/561* (2013.01)

(58) Field of Classification Search
USPC .......... 396/428, 421, 423, 427; 348/373, 376; 248/125.8, 186.1, 187.1
See application file for complete search history.

(56) References Cited

U.S. PATENT DOCUMENTS

| 2,016,744 | A | * | 10/1935 | Heck .............................. 248/155 |
| 2,374,021 | A | * | 4/1945 | Korling ......................... 248/411 |
| 4,621,785 | A | * | 11/1986 | Embra .......................... 248/565 |
| 5,341,185 | A | * | 8/1994 | Nakatani ....................... 396/428 |
| 6,027,087 | A | * | 2/2000 | Lindemann et al. ......... 248/188.5 |
| 7,244,070 | B2 | * | 7/2007 | Burnett et al. ................ 396/420 |
| 2005/0207749 | A1 | * | 9/2005 | Barker et al. ................. 396/428 |
| 2009/0084912 | A1 | * | 4/2009 | Speggiorin ................. 248/176.3 |
| 2013/0287386 | A1 | * | 10/2013 | Xu ................................ 396/428 |

FOREIGN PATENT DOCUMENTS

| CN | 101273229 A | 9/2008 |
| CN | 202362576 U | 8/2012 |
| WO | 2007/039000 A1 | 4/2007 |

* cited by examiner

*Primary Examiner* — Rochelle-Ann J Blackman
(74) *Attorney, Agent, or Firm* — Osha Liang LLP

(57) ABSTRACT

A unipod rotating apparatus includes a main rod, an adapting platform fixing photographic equipment, and a rotating device connecting the adapting platform to the main rod in a rotatable manner, in which the rotating device includes a rotating tube, a first connecting structure, a second connecting structure and a rotation connecting structure, in which the rotating tube is sleeved around the main rod; the first connecting structure fixedly connects the adapting platform to the upper end of the rotating tube; the second connecting structure is fixedly connected to the upper end of the main rod; and the rotation connecting structure is arranged between the first connecting structure and the second connecting structure, such that the first connecting structure and the second connecting structure are connected with each other in a relatively rotatable manner.

17 Claims, 6 Drawing Sheets

UNIPOD ROTATING APPARATUS

CROSS-REFERENCE TO RELATED APPLICATIONS

Pursuant to 35 U.S.C. §119 and the Paris Convention Treaty, this application claims the benefit of Chinese Patent Application No. 201310266194.5 filed on Jun. 28, 2013, the contents of which are incorporated herein by reference.

BACKGROUND OF THE INVENTION

1. Field of the Invention

The invention relates to a rotating device for use in video shooting equipment, in particular to a unipod rotating apparatus for use in video shooting equipment.

2. Description of Related Art

When video shooting is performed with photographic equipment, in order to reduce shaking of the photographic equipment in shooting and improve the video shooting quality, usually pods for fixing the photographic equipment are used to assist shooting, and in order to achieve all-direction shooting with the photographic equipment, the used pods are required to have 360° rotation function as well.

Chinese patent document CN101273229A discloses a unipod support with fluid damping particularly for video shooting, and in the unipod support, a base and an attachment for a video shooting device are arranged at corresponding longitudinal opposite ends of a rod, wherein the base serves as a supporting seat for supporting on the ground, and the base also comprises an articulation piece with a cup and ball joint; the rod can be oriented relative to the base by means of the articulation piece; the cup and ball joint is connected to a cup-like member by means of a shank thereof; and the lower end of the rod is fit into the cup member through insertion into a sleeve. That is, in the unipod support, through the action of the articulation piece with the cup and ball joint, the rod can rotate about the basic longitudinal axis of the rod relative to the base, thereby achieving 360° all-direction rotation of the video shooting device. The unipod support described in the above patent document has the following disadvantages: the rotating structure for adjusting the rotating angle of the video shooting device in the patent document is formed by cooperation of a sleeve cup and a sleeve rod inserted therein, and as clearance exists between the sleeve rod and the sleeve cup, and the sleeve cup is arranged close to the base and away from an adapting platform, when the sleeve rod slightly rotates in the sleeve cup, obvious vibration of the video shooting device located at the upper end of the sleeve rod will occur, such that the picture of shot videos is unstable, and the video shooting quality is poor, and thus a corresponding damping device needs to be arranged between the sleeve cup and the sleeve rod to dampen and weaken vibration of a photographic device during rotation; however, as the damping device adopts damping oil for damping, the structurally sealing requirement is high; in addition, after a long time of use, a seal ring is aged and is worn off, and the damping oil inside is gradually used up or leaked such that the damping effect is greatly reduced, and thus unipod disassembly, damping oil addition and unipod reassembly work are needed, which brings great inconvenience to a user.

In order to solve the above problems, Chinese patent document CN202362576U discloses a video camera unipod, which is composed of a video camera fixing screw, a universal joint, a tightness regulating screw, an inner draw bar, an outer tube, a fastening cap and a base, wherein the video camera fixing screw is fixed on a universal joint cap; the inner draw bar is fixed under a universal joint ball; the universal joint ball is sleeved inside the universal joint cap; the tightness regulating screw locking the universal joint ball is provided at a lateral side of the universal joint cap; the base is fixed to the bottom of outer tube; and the inner draw bar and the outer tube are fixed by the fastening cap. In the case of the video camera unipod described in the patent document, a video shooting device is connected to the upper end of the unipod through the video camera fixing screw; when rotation is needed, the tightness regulating screw is rotated, such that the universal joint ball is unlocked, and the universal joint cap is further rotated, and the universal joint cap drives the video shooting device to rotate relative to the inner draw bar and the outer pipe, thereby achieving 360° all-direction rotation of the video shooting device; and when the video shooting device needs to be fixed, the tightness regulating screw can be screwed tightly, so that the universal joint ball is locked, and the universal joint cap and the video shooting device are fixed and cannot rotate under the action of an external force.

The video camera unipod described in the abovementioned patent document has the following shortcomings: when the angle of the photographic device needs to be horizontally adjusted, as the rotating structure of the prior art adopts the cooperation of the universal joint cap and the universal joint ball, when the universal joint cap is manually rotated, it is difficult to ensure that the axis of the universal joint cap would not tilt relative to the axis in the vertical direction of the universal joint ball in the horizontal rotation process, which is therefore unfavorable for obtaining an accurate photographing angle; in addition, as the structure for locking the universal joint cap and the universal joint ball is the regulating screw arranged in a projecting manner, not only is the appearance of the whole unipod affected, but also the projecting screw is likely to hook clothing of a photographer.

SUMMARY OF THE INVENTION

To this end, the inventions aims at solving the technical problems that the video camera unipod in the prior art is unreasonable in structure, inaccurate in angle adjustment, poor in appearance and inconvenient to use, and thus providing a unipod rotating apparatus which has a reasonable structure and is convenient to use.

In view of the above-described problem, it is one objective of the invention to provide the unipod rotating apparatus of the invention comprising a main rod, an adapting platform for fixing a photographic equipment, and a rotating device connecting the adapting platform to the main rod in a rotatable manner; the rotating device comprises a rotating tube sleeved around the main rod;

a first connecting structure fixedly connecting the adapting platform to an upper end of the rotating tube;

a second connecting structure fixedly connected to an upper end of the main rod; and a rotation connecting structure arranged between the first connecting structure and the second connecting structure, such that the first connecting structure and the second connecting structure are connected with each other in a relatively rotatable manner.

In a class of the embodiment, the first connecting structure comprises an upper joint and an adapting screw, wherein an upper joint internal threaded hole is axially formed in the upper joint, and the adapting platform is connected to the upper joint in such a manner that the adapting screw passes through the upper joint internal threaded hole; the upper end inner wall of the rotating tube and an outer wall of the upper joint are connected by means of threads; the second connecting structure comprises a main rod joint, and an inner wall of the upper end of the main rod and an outer wall of the main rod joint are in threaded connection by means of threads; the rotation connecting structure comprises a connecting seat arranged between the upper joint and the main rod joint, and a connecting screw, wherein a stepped hole is axially formed in the connecting seat, and an inner wall of the stepped hole and an lower end outer wall of the upper joint are in threaded connection with each other; a head of the connecting screw is disposed in the stepped hole, and abuts against an step surface of the stepped hole; and a threaded rod part of the connecting screw protrudes out of the stepped hole and is in threaded connection with a first main rod threaded hole formed in the main rod joint.

In a class of the embodiment, the connecting seat is in the shape of drum with a central hole formed in a bottom face thereof; the stepped hole is formed by the drum-shaped inner cavity of the connecting seat and the central hole; and an accommodating cavity adapted for receiving a lower end of the connecting seat is formed in the main rod joint and the first main rod threaded hole is coaxially provided at a lower end of the accommodating cavity and is communicated with the accommodating cavity.

In a class of the embodiment, the upper joint internal threaded hole of the upper joint is provided at the lower end of the upper joint, and an insertion hole is provided at an upper end of the upper joint, and is coaxially communicated with the upper joint internal threaded hole; a boss adapted for being inserted into the insertion hole is formed at a lower end of the adapting platform, and the adapting platform is axially provided with a stepped hole, which passes through the boss; the adapting screw is a stud with a stop flange in the middle and threads at both ends, the stop flange of the stub abuts against a step surface of the adapting platform, and a lower end of the stud passes through the insertion hole and is screwed into the top end internal threaded hole; and a radial threaded hole communicated with the upper joint internal threaded hole is radially formed on a side wall of the upper joint, and a fastening screw passes through the radial threaded hole and abuts against the boss of the adapting platform to lock the adapting platform.

In a class of the embodiment, the first connecting structure comprises a top end joint, an adapting screw and a rotating tube connecting seat, wherein a top end internal threaded hole is formed axially in the top end joint, and the adapting platform is connected to the top end joint in such a manner that the adapting screw passes through the top end internal threaded hole; the rotating tube connecting seat is arranged between the top end joint and the upper end of the rotating tube, and an upper end of the rotating tube is adapted for being in threaded connection with the top end joint; and a lower end of the rotating tube is adapted for being in threaded connection with the upper end of the rotating tube; the second connecting structure is a main rod joint, and a lower end inner wall of the main rod joint is in threaded connection with the upper end outer wall of the main rod; the rotation connecting structure is a connecting screw; a through hole is formed in the rotating tube connecting seat, and a second main rod threaded hole coaxial with the through hole is formed in the main rod joint; and the connecting screw successively passes through the though hole and the second main rod threaded hole, and connects the rotating tube connecting seat with the main rod joint.

In a class of the embodiment, a cylindrical boss is formed on a lower end face of the top end joint, and a second main rod internal threaded hole is formed in the cylindrical boss, and an insertion hole adapted for insertion of the cylindrical boss is formed at the center of the head end face of the connecting screw.

In a class of the embodiment, the top end internal threaded hole of the top end joint is provided at a lower end of the top end joint, and an insertion hole is provided at an upper end of the top end joint and is coaxially communicated with the top end internal threaded hole; a boss adapted for being inserted into the insertion hole is formed at a lower end of the adapting platform, and the adapting platform is axially provided with a stepped hole, which passes through the boss; the adapting screw is a stud with a stop flange in the middle and threads at both ends, the stop flange of the stub abuts against a step surface of the adapting platform, and a lower end of the stud passes through the insertion hole and is screwed into the top end internal threaded hole; and a radial threaded hole communicated with the top end internal threaded hole is radially formed on a side wall of the top end joint, and a fastening screw passes through the radial threaded hole and abuts against the boss of the adapting platform to lock the adapting platform.

In a class of the embodiment, the unipod rotating apparatus further comprises a locking structure, and the locking structure comprises a fixing rod sleeved around the main rod and arranged inside the rotating tube, an upper end of the fixing rod being connected with the main rod joint; a locking port being cone-shaped, arranged at a lower end of the rotating tube, and located between an inner wall of the rotating tube and an outer wall of the fixing rod; and a locking assembly comprising a conical locking ring adapted for being inserted into the locking port for cooperation in a locking manner, and a locking knob connected with the locking ring, wherein the locking knob is arranged at a lower end of the fixing rod in such a manner that the locking knob is axially reciprocal movable along the fixing rod, so as to be able to drive the locking ring to be inserted into or separated from the locking port.

In a class of the embodiment, a rotating tube lower joint is provided at the lower end of the rotating tube, and the rotating tube lower joint is in threaded connection with the lower end of the rotating tube; and the locking port is formed by an inner cavity of the rotating tube lower joint and the outer wall of the fixing rod in cooperation.

In a class of the embodiment, a recess is formed below a joint between the rotating tube lower joint and the rotating tube, and a rubber ring is disposed in the recess.

In a class of the embodiment, the locking knob is arranged at the lower end of the fixing rod and in threaded connection with the lower end of the fixing rod.

In a class of the embodiment, a fixing rod lower joint is provided at the lower end of the fixing rod is provided, and the locking knob is in threaded connection with the fixing rod lower joint.

In a class of the embodiment, a recess is formed on the outer side wall of the locking ring, and a projection for insertion into the recess is formed on an inner side wall of the locking knob; and the locking knob is adapted for driving the locking ring to lock outward or retract through cooperation of the recess and the projection.

In a class of the embodiment, a wear-proof ring is connected to the lower end of the rotating tube, and the wear-proof ring is sleeved around the main rod.

In a class of the embodiment, a gasket is arranged between the connecting screw and the connecting seat.

In a class of the embodiment, a wrist strap buckle is arranged below the adapting platform.

In a class of the embodiment, the fastening screw is provided at the lateral side of the first connecting structure, and the fastening screw passes through the first connecting structure and abuts against the adapting platform.

In a class of the embodiment, a hand guard sheath is sleeved around the rotating tube.

Compared with the prior art, the invention has the following advantages:

(1) With the unipod rotating apparatus of the invention, not only can 360° angle adjustment of the photographic equipment on the adapting platform be implemented, but also all rotating component structures are disposed in the rotating tube, and the apparatus looks very attractive in appearance.

(2) In the unipod rotating apparatus of the invention is also provided a locking structure, which can lock the rotating tube, and prevent the unipod rotating apparatus from rotating under the action of an external force or accidental touch, which results in an inaccurate photographing or video shooting angle of the photographic equipmen or low picture quality t.

(3) In the unipod rotating apparatus of the invention, a wear-proof ring is connected to the lower end of the rotating tube, and the wear-proof ring is sleeved around the main rod, and the arrangement of the wear-proof ring can prevent friction between the rotating tube and the main rod during rotation, which results in wear.

(4) In the unipod rotating apparatus of the invention, a gasket is arranged between the connecting screw and the connecting seat, and the gasket can prevent abrasion between the connecting seat and the connecting screw during rotation.

(5) In the unipod rotating apparatus of the invention, a wrist strap buckle is arranged below the adapting platform, so that in the process of using or carrying the unipod, a user can conveniently sleeve the wrist strap buckle around a wrist to prevent the unipod from accidentally tumbling or falling off to result in damage to the apparatus.

(6) In the unipod rotating apparatus of the invention, a hand guard sheath is also sleeved around the rotating tube, and the arrangement of the hand guard sheath can improve the use handfeel of the unipod rotating apparatus during rotation.

BRIEF DESCRIPTION OF DRAWINGS

For the purpose that the contents of the invention are more readily clearly understood, the invention is further illustrated in detail below according to the embodiments of the invention in conjunction with the drawings, wherein.

Figure 1:
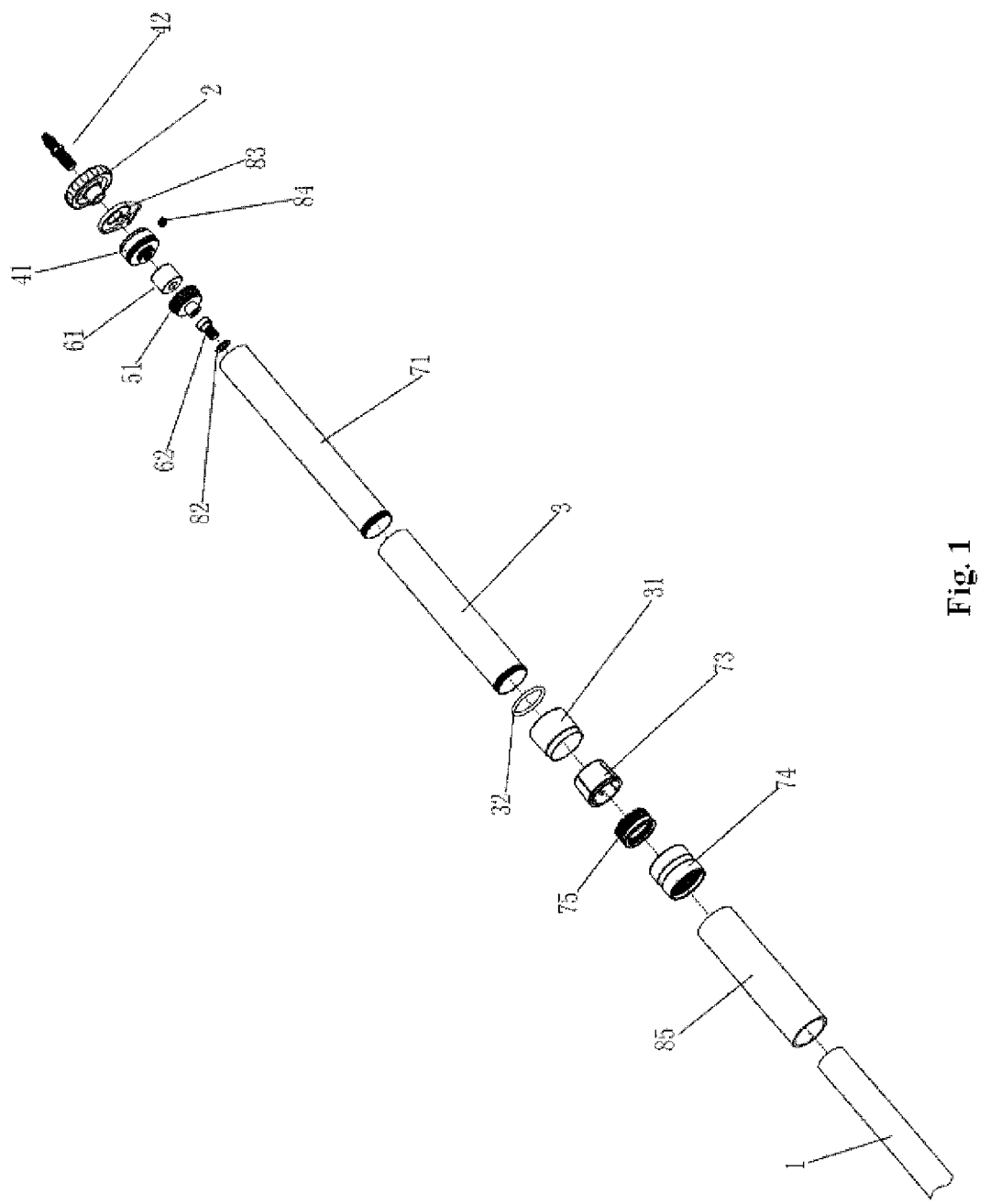
FIG. 1 is an exploded schematic view of one embodiment of a unipod rotating apparatus of the invention.

Reference numerals in the figures are as follows:

1—main rod; 2—adapting platform; 3—rotating tube; 31—rotating tube lower joint; 32—rubber ring; 41—upper joint; 41—adapting screw; 43—top end joint; 44—rotating tube connecting seat; 51—main rod joint; 61—connecting seat; 62—connecting screw; 71—fixing rod; 72—locking port; 73—locking ring; 74—locking knob; 75—fixing rod lower joint; 81—wear-proof ring; 82—gasket; 83—wrist strap buckle; 84—fastening screw; and 85—hand guard sheath.

DETAILED DESCRIPTION OF THE EMBODIMENTS

The invention will be further discussed below using the following embodiments in conjunction with the drawings.

Embodiment 1

Figure 2:
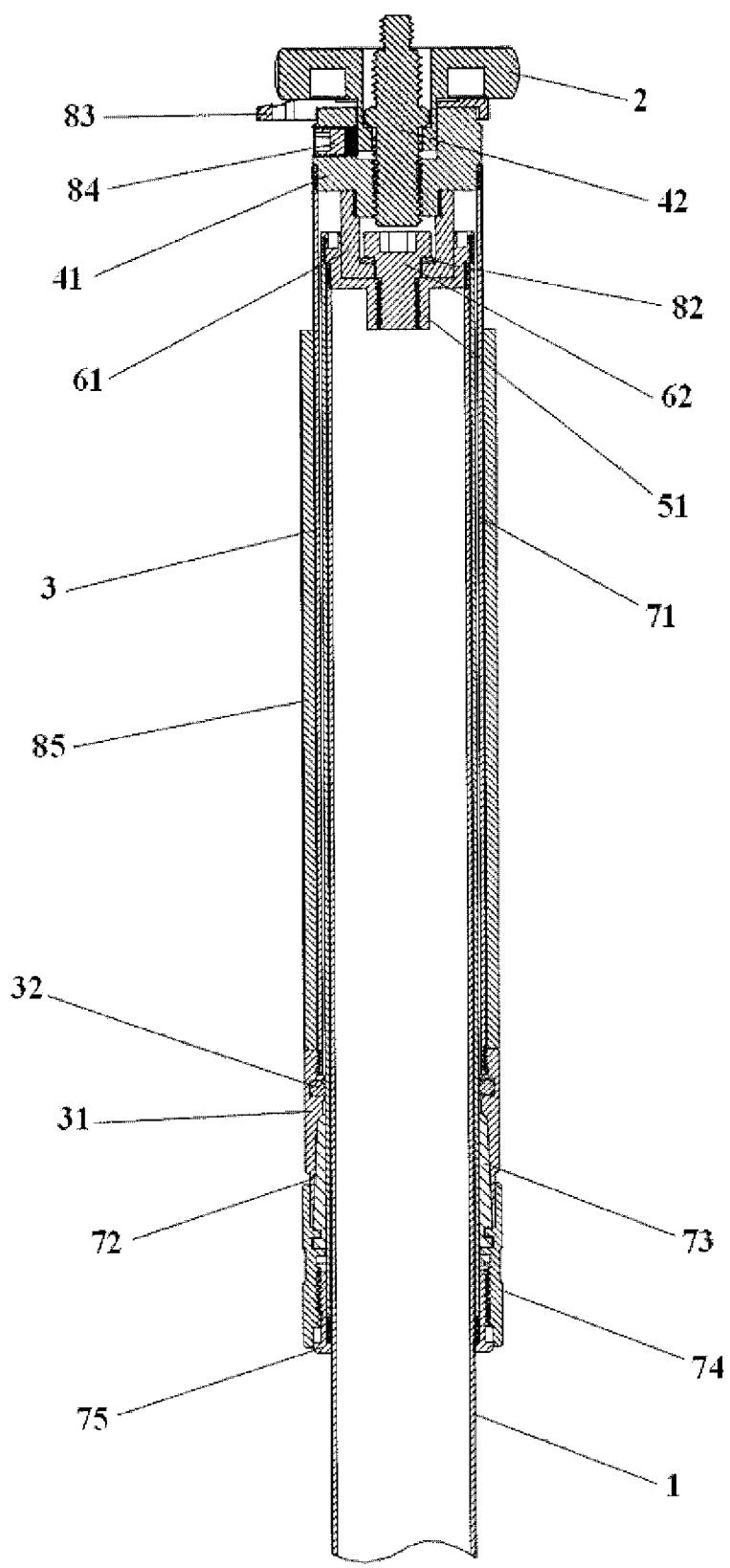
FIG. 2 is an assembly schematic view of one embodiment of the unipod rotating apparatus of the invention.

As shown in FIGS. 1-2, a unipod rotating apparatus of the embodiment comprises a main rod 1, an adapting platform 2 for fixing photographic equipment, and a rotating device connecting the adapting platform 2 to the main rod 1 in a rotatable manner, wherein the rotating device comprises a rotating tube 3, a first connecting structure, a second connecting structure and a rotation connecting structure, wherein the rotating tube 3 is sleeved around the main rod 1; the first connecting structure fixedly connects the adapting platform 2 to the upper end of the rotating tube 3; the second connecting structure is fixedly connected to the upper end of the main rod 1; and the rotation connecting structure is arranged between the first connecting structure and the second connecting structure, such that the first connecting structure and the second connecting structure is connected with each other in a relatively rotatable manner. In this embodiment, through providing the rotation connecting structure, the first connecting structure and the second connecting structure can be connected in a relatively rotatable manner; under the action of the rotation connecting structure, the rotating tube 3 and the first connecting structure can drive the adapting platform to implement a 360° rotation relative to the second connecting structure, thereby achieving 360° rotation of the photographic equipment connected to the adapting platform 2; and therefore the unipod rotating apparatus is reasonable in structure, and not only can 360° angle adjustment of the photographic equipment on the adapting platform conveniently be implemented, but also the whole unipod looks very attractive in appearance because all the component structures are disposed or hidden in the rotating tube.

In a preferred embodiment, the first connecting structure comprises an upper joint 41 and an adapting screw 42, wherein an upper joint internal threaded hole is axially formed in the upper joint 41, and the adapting platform 2 is connected to the upper joint 41 in such a manner that the adapting screw 42 passes through the upper joint internal threaded hole; the upper end inner wall of the rotating tube 3 and the outer wall of the upper joint 41 are connected by means of threads; the second connecting structure comprises a main rod joint 51, the inner wall of the upper end of the main rod 1 and the outer wall of the main rod joint 51 are in threaded connection by means of threads; the rotation connecting structure comprises a connecting seat 61 arranged between the upper joint 41 and the main rod joint 51, and a connecting screw 62, wherein a stepped hole is axially formed in the connecting seat 61, and the inner wall of the stepped hole and the lower end outer wall of the upper joint 41 are in threaded connection; the head of the connecting screw 62 is disposed in the stepped hole, and abuts against the step surface of the stepped hole; and a threaded rod part of the connecting screw 62 protrudes out of the stepped hole and is in threaded connection with a first main rod threaded hole formed in the main rod joint 51.

The upper joint internal threaded hole of the upper joint 41 is provided at the lower end of the upper joint 41, and an insertion hole is provided at the upper end of the upper joint 41, and is coaxially communicated with the upper joint internal threaded hole; at the lower end of the adapting platform 2 is formed a boss adapted for being inserted into the insertion hole, and the adapting platform 2 is axially provided with a stepped hole, which passes through the boss; the adapting screw 42 is a stud with a stop flange in the middle and threads at both ends, the stop flange of the stub abuts against the step surface of the adapting platform 2, and the lower end of the stud passes through the insertion hole and is screwed into the upper joint internal threaded hole; and on the side wall of the upper joint 41 is radially formed a radial threaded hole communicated with the upper joint internal threaded hole, and a fastening screw 84 passes through the radial threaded hole and abuts against the boss of the adapting platform 2 to lock the adapting platform 2.

In this embodiment, the connecting seat 61 is in the shape of a drum with a central hole formed in the bottom face thereof; the stepped hole is formed by the drum-shaped inner cavity of the connecting seat 61 and the central hole; and in the main rod joint 51 is formed an accommodating cavity adapted for receiving the lower end of the connecting seat 61, and the first main rod threaded hole is coaxially provided at the lower end of the accommodating cavity and is communicated with the accommodating cavity. In this embodiment, a gasket 82 is further arranged between the connecting screw 62 and the connecting seat 61, and the gasket 82 can avoid direct friction between the connecting seat 61 and the connecting screw 62 during rotation, which results in wear.

Based on the above embodiment, a locking structure is further provided in the embodiment, the locking structure comprising a fixing rod 71, a locking port 72 and a locking assembly, wherein the fixing rod 71 is sleeved around the main rod 1 and inside the rotating tube 3, and the upper end of the fixing rod 71 is connected with the main rod joint 51; the locking port 72 is cone-shaped, arranged at the lower end of the rotating tube 3, and located between the inner wall of the rotating tube 3 and the outer wall of the fixing rod 71; and the locking assembly comprises a conical locking ring 73 adapted for being inserted into the locking port 72 for cooperation in a locking manner, and a locking knob 74 is connected with the locking ring 73, wherein the locking knob 74 is arranged at the lower end of the fixing rod 71 in such a manner that the locking knob is axially reciprocal movable along the fixing rod 71, so as to be able to drive the locking ring 73 to be inserted into or separated from the locking port 72. In this embodiment, the locking structure can lock the rotating tube 3, and prevent unnecessary rotation of the unipod rotating apparatus under the action of an external force or accidental touch, which results in an inaccurate photographing or video shooting angle or poor picture quality of the photographic equipment.

Figure 3:
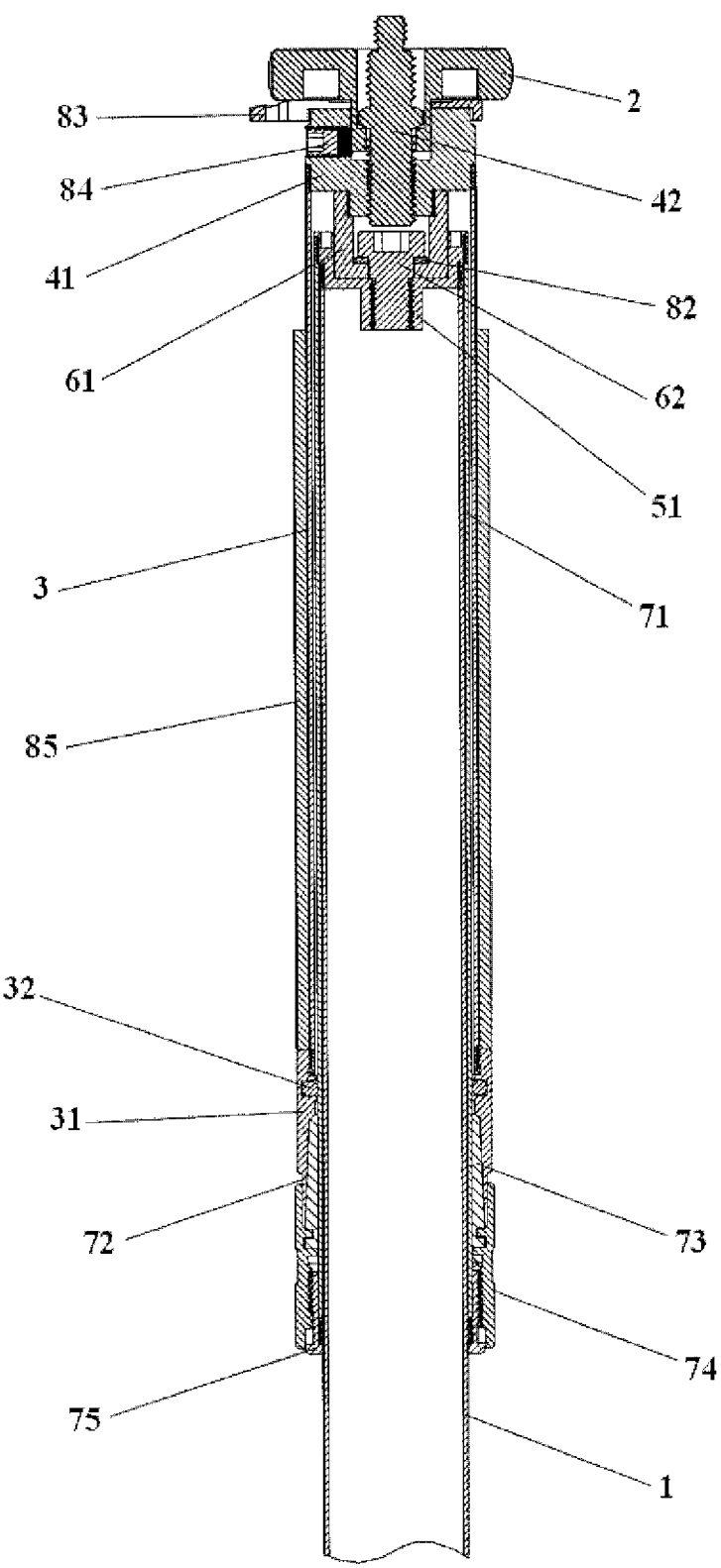
FIG. 3 is a structural schematic view of the unipod rotating apparatus shown in FIG. 1 when it is locked.
Figure 4:
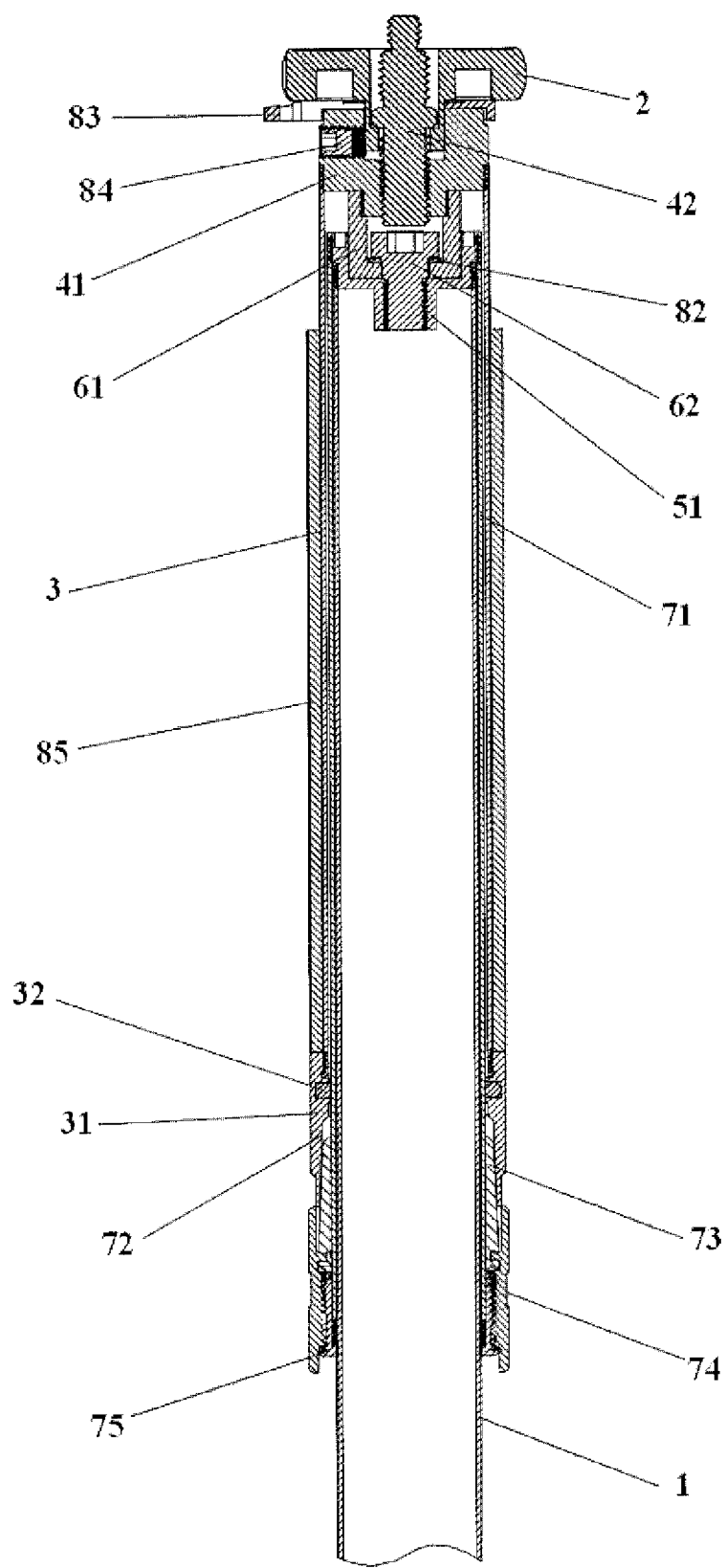
FIG. 4 is a structural schematic view of the unipod rotating apparatus shown in FIG. 1 when it is unlocked.

A rotating tube lower joint 31 is provided at the lower end of the rotating tube 3, and the rotating tube lower joint 31 is in threaded connection with the lower end of the rotating tube 3; the locking port 72 is formed by the inner cavity of the rotating tube lower joint 31 and the outer wall of the fixing rod 71; a recess is further formed below the mutual connection between the rotating tube lower joint 31 and the rotating tube 3, and a rubber ring 32 is disposed in the recess; the locking knob 74 is arranged at the lower end of the fixing rod 71 by means of threaded connection; a fixing rod lower joint 75 is provided at the lower end of the fixing rod 71, and the locking knob 74 is in threaded connection to the fixing rod lower joint 75; a recess is formed on the outer side wall of the locking ring 73, and a projection for insertion into the recess is formed on the inner side wall of the locking knob 74; and the locking knob 74 is able to drive the locking ring 73 to lock outward or retract through cooperation of the recess and the projection, as shown in FIGS. 3-4.

Further, on the basis of the above embodiment, a wrist strap buckle 83 is further provided below the adapting platform 2, and in the process of using or carrying the unipod, a user can sleeve the wrist strap buckle 83 around a wrist to prevent the unipod from accidentally tumbling or falling off to result in damage to the equipment; the fastening screw 84 is provided at the lateral side of the first connecting structure, and the fastening screw 84 passes through the first connecting structure and abuts against the adapting platform 2; the fastening screw 84 further locks the adapting platform 2 and the first connecting structure; and a hand guard sheath 85 is further sleeved around the rotating tube 3, and the arrangement of the hand guard sheath 85 can improve the usability and handfed of the unipod rotating apparatus during rotation.

Embodiment 2

Figure 5:
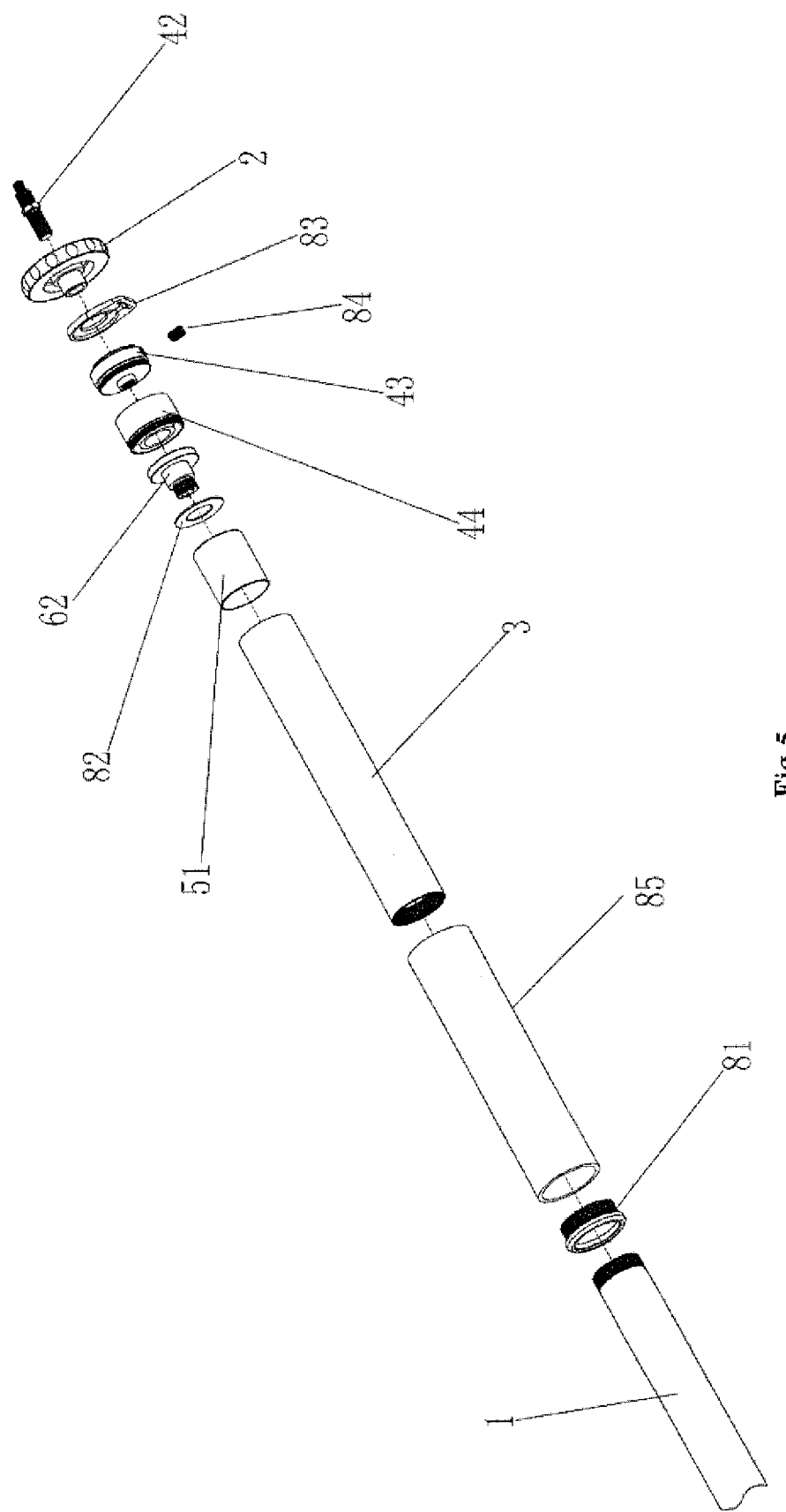
FIG. 5 is an exploded schematic view of another embodiment of the unipod rotating apparatus of the invention.
Figure 6:
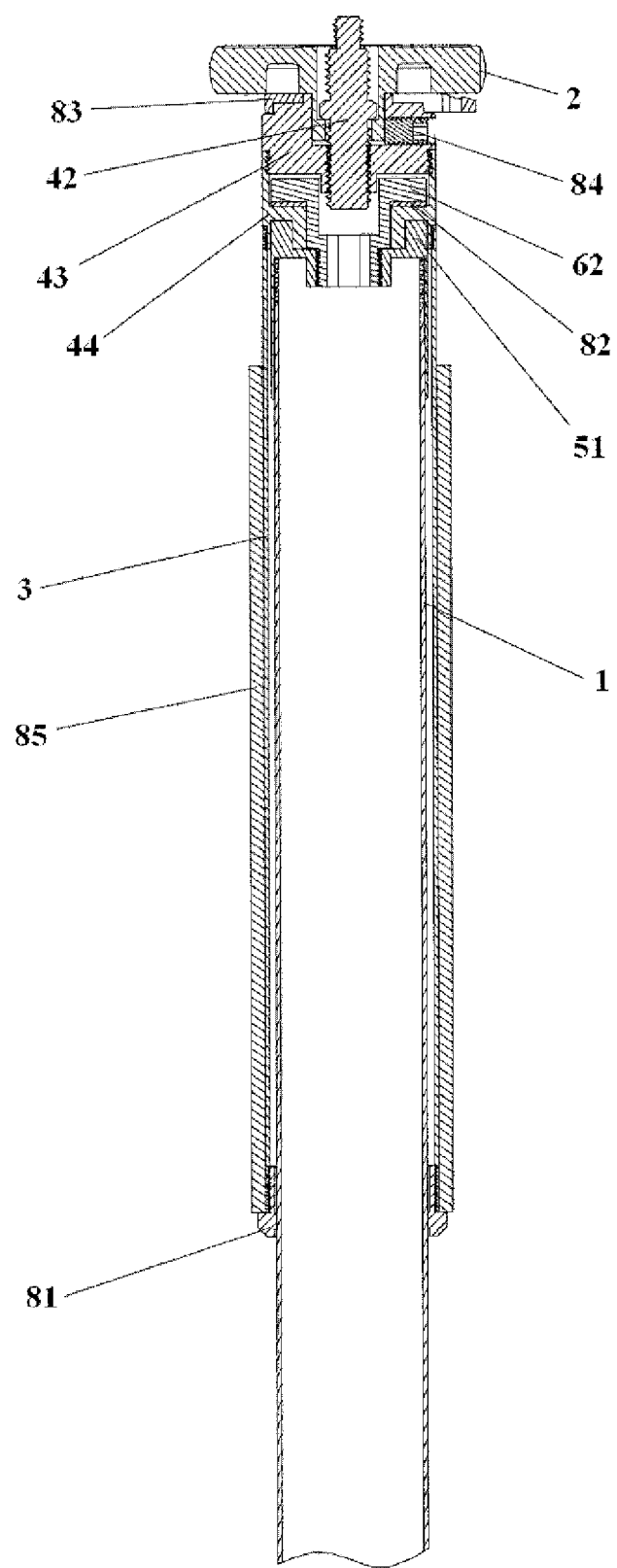
FIG. 6 is a assembly schematic view of another embodiment of the unipod rotating apparatus of the invention.

In another embodiment of this invention, alternatively, the first connecting structure comprises a top end joint 43, an adapting screw 42 and a rotating tube connecting seat 44, wherein, a top end internal threaded hole is formed axially in the top end joint 43, and the adapting platform 2 is connected to the top end joint 43 in such a manner that the adapting screw 42 passes through the top end internal threaded hole; the rotating tube connecting seat 44 is arranged between the top end joint 43 and the upper end of the rotating tube 3, and the upper end of the rotating tube 3 is adapted for being in threaded connection with the top end joint 43, and the lower end of the rotating tube 3 is adapted for being in threaded connection with the upper end of the rotating tube 3; the second connecting structure is a main rod joint 51, and the lower end inner wall of the main rod joint 51 is in threaded connection with the upper end outer wall of the main rod 1; the rotation connecting structure is a connecting screw 62; a through hole is formed in the rotating tube connecting seat 44, and a second main rod threaded hole coaxial with the through hole is formed in the main rod joint 51; and the connecting screw 62 successively passes through the though hole and the second main rod threaded hole, and connects the rotating tube connecting seat 44 with the main rod joint 51, as shown in FIG. 5-FIG. 6.

The top end internal threaded hole of the top end joint 43 is provided at the lower end of the top end joint 43, and an insertion hole is provided at the upper end of the top end joint 43, and is coaxially communicated with the top end internal threaded hole; a boss adapted for being inserted into the insertion hole is formed at the lower end of the adapting platform 2, and the adapting platform 2 is axially provided with a stepped hole, which passes through the boss; the adapting screw 42 is a stud with a stop flange in the middle and threads at both ends, the stop flange of the stub abuts against the step surface of the adapting platform 2, and the lower end of the stud passes through the insertion hole and is screwed into the top end internal threaded hole; and a radial threaded hole communicated with the top end internal threaded hole is radially formed on the side wall of the top end joint 43, and a fastening screw 84 passes through the radial threaded hole and abuts against the boss of the adapting platform 2 to lock the adapting platform 2.

In this embodiment, a cylindrical boss is formed on the lower end face of the top end joint 43, and a second main rod internal threaded hole is formed in the cylindrical boss, and an insertion hole adapted for insertion of the cylindrical boss is formed at the center of the head end face of the connecting screw 62.

Based on the above embodiment, in the embodiment, a wear-proof ring 81 is connected to the lower end of the rotating tube 3, and the wear-proof ring 81 is sleeved around the main rod 1, and the arrangement of the wear-proof ring 81 can prevent friction between the rotating tube 3 and the main rod 1 during rotation, which results in wear.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A unipod rotating apparatus, comprising
a main rod,
an adapting platform for fixing a photographic equipment, and
a rotating device connecting the adapting platform to said main rod in a rotatable manner, wherein
said rotating device comprises
a rotating tube, sleeved around said main rod;
a first connecting structure, fixedly connecting said adapting platform to an upper end of said rotating tube;
a second connecting structure, fixedly connected to an upper end of said main rod; and
a rotation connecting structure, arranged between said first connecting structure and said second connecting structure, such that said first connecting structure and said second connecting structure are connected with each other in a relatively rotatable manner.

2. The unipod rotating apparatus of claim 1, wherein
said first connecting structure comprises an upper joint and an adapting screw, wherein an upper joint internal threaded hole is axially formed in said upper joint, and said adapting platform is connected to said upper joint in such a manner that said adapting screw passes through said upper joint internal threaded hole; an inner wall at said upper end of said rotating tube and an outer wall of said upper joint are connected by means of threads;
said second connecting structure comprises a main rod joint, and an inner wall of said upper end of said main rod an outer wall of the main rod joint are in threaded connection with each other; and
said rotation connecting structure comprises a connecting seat arranged between said upper joint and said main rod joint, and a connecting screw, wherein a stepped hole is axially formed in said connecting seat, and an inner wall of the stepped hole and an lower end outer wall of said upper joint are in threaded connection with each other; a head of said connecting screw is disposed in said stepped hole, and abuts against a step surface of said stepped hole; and a threaded rod part of said connecting screw protrudes out of said stepped hole and is in threaded connection with a first main rod threaded hole formed on said main rod joint.

3. The unipod rotating apparatus of claim 2, wherein
said connecting seat is in the shape of a drum with a central hole formed on a bottom face thereof; said stepped hole is formed by the drum-shaped inner cavity of said connecting seat and said central hole; and an accommodating cavity adapted for receiving a lower end of the connecting seat is formed in said main rod joint, and said first main rod threaded hole is coaxially provided at a lower end of said accommodating cavity and is communicated with said accommodating cavity, 4. The unipod rotating apparatus of claim 2, wherein
said upper joint internal threaded hole of said upper joint is provided at a lower end of said upper joint, and an insertion hole is provided at an upper end of said upper joint and is coaxially communicated with said upper joint internal threaded hole; a boss adapted for being inserted into an insertion hole is formed at a lower end of the adapting platform, and said adapting platform is axially provided with a stepped hole, which passes through said boss; said adapting screw is a stud with a stop flange in the middle and threads at both ends, said stop flange of said stub abuts against a step surface of said adapting platform, and a lower end of said stud passes through said insertion hole and is screwed into said upper joint internal threaded hole; and a radial threaded hole communicated with said upper joint internal threaded hole is radially formed on a side wall of said upper joint, and a fastening screw passes through said radial threaded hole and abuts against said boss of said adapting platform to lock said adapting platform.

5. The unipod rotating apparatus of claim 2, wherein
a gasket is arranged between said connecting screw and said connecting seat.

6. The unipod rotating apparatus of claim 1, wherein
said first connecting structure comprises
a top end joint,
an adapting screw and
a rotating tube connecting seat,
wherein a top end internal threaded hole is formed axially in said top end joint, and said adapting platform is connected to said top end joint in such a manner that said adapting screw passes through said top end internal threaded hole; said rotating tube connecting seat is arranged between said top end joint and an upper end of the rotating tube, and said upper end of said rotating tube is adapted for being in threaded connection with said top end joint; and a lower end of the rotating tube is adapted for being in threaded connection with said upper end of the rotating tube;
said second connecting structure is a main rod joint, and a lower end inner wall of said main rod joint is in threaded connection with said upper end outer wall of said main rod;
said rotation connecting structure is a connecting screw; a through hole is formed in the rotating tube connecting seat, and a second main rod threaded hole coaxial with said through hole is formed in said main rod joint; and said connecting screw successively passes through said though hole and said second main rod threaded hole, and connects said rotating tube connecting seat with said main rod joint.

7. The unipod rotating apparatus of claim 6, wherein
a cylindrical boss is formed on a lower end face of said top end joint, and a second main rod internal threaded hole is formed in said cylindrical boss, and an insertion hole adapted for insertion of the cylindrical boss is formed at the center of the head end face of the connecting screw.

8. The unipod rotating apparatus of claim 6, wherein said top end internal threaded hole of said top end joint is provided at a lower end of said top end joint, and an insertion hole is provided at an upper end of said top end joint, and is coaxially communicated with said top end internal threaded hole; a boss adapted for being inserted into said insertion hole is formed at a lower end of said adapting platform, and said adapting platform is axially provided with a stepped hole, which passes through said boss; said adapting screw is a stud with a stop flange in the middle and threads at both ends, said stop flange of said stub abuts against a step surface of said adapting platform, and a lower end of said stud passes through said insertion hole and is screwed into said top end internal threaded hole; and a radial threaded hole communicated with said top end internal threaded hole is radially formed on a side wall of said top end joint, and a fastening screw passes through said radial threaded hole and abuts against said boss of said adapting platform to lock said adapting platform.

9. The unipod rotating apparatus of claim 1, further comprising a locking structure, which comprises
a fixing rod sleeved around said main rod and arranged inside said rotating tube, an upper end of said fixing rod connected with main rod joint;
a locking port being cone-shaped, arranged at a lower end of said rotating tube, and located between an inner wall of said rotating tube and an outer wall of said fixing rod; and
a locking assembly comprising a conical locking ring adapted for being inserted into said locking port for cooperation in a locking manner, and a locking knob connected with said locking ring, wherein said locking knob is arranged at a lower end of said fixing rod in such a manner that the locking knob is axially reciprocal movable along said fixing rod, so as to be able to drive said locking ring to be inserted into or separated from said locking port.

10. The unipod rotating apparatus of claim 9, wherein a rotating tube lower joint is provided at the lower end of the rotating tube, and said rotating tube lower joint is in threaded connection with said lower end of the rotating tube; and said locking port is formed by an inner cavity of said rotating tube lower joint and said outer wall of said fixing rod.

11. The unipod rotating apparatus of claim 10, wherein a recess is formed below a joint between said rotating tube lower joint and said rotating tube, and a rubber ring is disposed in said recess.

12. The unipod rotating apparatus of claim 11, wherein said locking knob is arranged at said lower end of said fixing rod and in threaded connection with said lower end of said fixing rod.

13. The unipod rotating apparatus of claim 12, wherein a fixing rod lower joint is provided at said lower end of said fixing rod, and said locking knob is threaded connection with said fixing rod lower joint.

14. The unipod rotating apparatus of claim 13, wherein a recess is formed on an outer side wall of said locking ring, and a projection for insertion into the recess is formed on an inner side wall of said locking knob;
and said locking knob is adapted for driving said locking ring to lock outward or retract through cooperation of said recess and said projection.

15. The unipod rotating apparatus of claims 1, wherein a wear-proof ring is connected to a lower end of said rotating tube and sleeved around the main rod.

16. The unipod rotating apparatus of claim 1, wherein a wrist strap buckle is arranged below said adapting platform.

17. The unipod rotating apparatus of claim 1, wherein a hand guard sheath is sleeved around said rotating tube.

* * * * *